United States Patent [19]

Rueggeberg et al.

[11] 4,065,137
[45] Dec. 27, 1977

[54] PLASMA-PROCESS VACUUM SEAL

[75] Inventors: Werner Rueggeberg; Joseph J. Wiker, both of Lancaster, Pa.

[73] Assignee: Armstrong Cork Company, Lancaster, Pa.

[21] Appl. No.: 717,109

[22] Filed: Aug. 24, 1976

[51] Int. Cl.² .............................................. F16J 15/14
[52] U.S. Cl. ....................................... 277/34; 34/242; 68/5 E; 277/3
[58] Field of Search ................... 277/34, 3, 34.3, 34.6; 68/5 E; 34/242

[56] References Cited

U.S. PATENT DOCUMENTS

| 3,178,779 | 4/1965 | Clark et al. | 277/34 |
| 3,302,432 | 2/1967 | Woollatt et al. | 68/5 E |
| 3,563,064 | 2/1971 | Yazawa | 68/5 E |
| 3,610,000 | 10/1971 | Lopata | 68/5 E |
| 3,788,651 | 1/1974 | Brown et al. | 277/34 |

Primary Examiner—Richard E. Aegerter
Assistant Examiner—L. Footland

[57] ABSTRACT

A vacuum seal designed for the continuous movement therethrough of fibrous materials, such as carpet yarn, into a gaseous-plasma vacuum system while preserving a vacuum of about 1 Torr is described. The seal comprises a lower metal block with an elongated groove formed in the flat upper surface thereof and an upper metal block having an open bottom air chamber formed in its lower flat surface. In its assembled form, a flexible membrane is positioned between the formed, flat surfaces of the blocks. A seal is formed by pressurizing the air chamber in the upper block, thereby forcing the flexible membrane against the groove in the lower block and the upper side of the material passing therethrough, thus forcing the material to conform to the shape of the groove. Continuous variation in the degree of vacuum seal may be achieved by varying the pressure in the air chamber in the upper block.

5 Claims, 3 Drawing Figures

PLASMA-PROCESS VACUUM SEAL

BACKGROUND OF THE INVENTION

1. Field of the Invention

This invention relates generally to a means for continuously feeding material such as yarn into a vacuum system while preserving the vacuum. More particularly, the invention relates to a sealing means for a gaseous-plasma vacuum system wherein the sealing means includes upper and lower metal blocks. An open bottom air chamber in the lower surface of the upper block, and a longitudinal groove in the upper surface of the lower block are separated by a flexible membrane. When air under pressure is supplied to the air chamber in the upper block the flexible membrane is forced downwardly against the groove in the lower block and the material moving therethrough, causing the material to conform to the shape of the groove, thus effecting a seal.

2. Description of the Prior Art

Inflatable seals have been used in the past. Such seals are conventionally located in a groove in one of a pair of confronting surfaces and inflation of the seal is arranged to cause an upper portion of the seal to deform into sealing contact with the other surface. Such a seal is disclosed by U.S. Pat. No. 3,788,651.

Pressure operated flexible membranes have also been used in the past to control the movement of material from one region to another where the regions are at different pressures. U.S. Pat. No. 2,470,744, for example, relates to a two-stage pneumatic valve arrangement for the transporting of particles, batchwise, between regions at substantially different pressures. The device comprises essentially a conduit having a pair of valves arranged in tandem therein, positioned at longitudinally-spaced regions. Upon operation of the valves, sealing is accomplished by means of air pressure on a pair of flexible membranes, forcing them against valve seats positioned in the center of the conduit.

U.S. Pat. No. 2,598,207 relates to valving means for shutting off or regulating the flow of pulverized or granular materials or fluids generally through a confining conduit. The apparatus comprises an expansible bag positioned within a conduit. The bag may be fastened to the inner wall of the conduit or in an interior depression therein and may be inflated or deflated to control the flow of material therethrough. The bag may extend throughout substantially the entire length of the conduit or only a portion thereof. Means responsive to variations in pressure in the conduit are provided to result in corresponding variations in control of the pressure within the inflatable member.

U.S. Pat. No. 2,604,246 relates to a feeding apparatus which comprises a valve which is particularly adapted for use in controlling the flow of finely divided, free-flowing materials. The valve in general comprises a rigid outer wall or casing, within which is inserted a thin elastic lining, which is normally positioned adjacent the rigid outer wall, but which may be laterally distended or stretched as by air pressure to a position in which its inner surfaces contact each other over a substantial area, thereby closing off the passageway normally existing centrally thereof. Air pressure is exerted against the outer surfaces of the inner lining, and is applied in such a way as to cause the central portion of the elastic walls to contact first, after which the walls contact progressively downward. The lower half of the walls of the inner lining is made thinner than the upper half as a further aid in causing the bottom portion of the lining to move downwardly upon application of air pressure, thereby exerting a pushing action on any material present centrally of the two but nearer the bottom thereof.

In the past, one of the main problems in the treatment of fibers with plasma on a commercial scale was the need for a means of introducing the material continuously via seals into an environment maintained at a lower-than-ambient pressure while still preserving the vacuum. The foregoing disclosures offer no solution to this problem.

SUMMARY OF THE INVENTION

This invention relates to a vacuum seal especially designed for the continuous movement of fibrous materials, such as carpet yarn, into a gaseous-plasma vacuum system. The treatment imparted by the electrically activated gas is intended to modify the yarn-surface characteristics for improved properties which typically could be identified with improved dyeability, soil resistance, etc. This particular vacuum system forms no part of this invention and is not here described since it is only of interest in consideration of its general characteristics as related to the operation of the invention.

The main feature of the vacuum seal of this invention comprises an accurately contoured elongated duct, one of the retaining walls of which consists of a flexible, pressurized membrane that constantly adjusts itself to compensate for yarn dimensional variations, however small such variations may be. This arrangement maintains a restriction that permits substantial pressure differences to exist during the continuous passage of yarn between the two regions of different pressure. The seal includes a pair of rigid body members having flat parallel surfaces. An elongated groove is formed in a surface of the body members and a fluid-receiving chamber is formed in a surface of the other body member. The body members are fastened together with the groove in the surface of one body member in confronting relation with the fluid-receiving chamber in the other body member. Prior to fastening the two body members together, a flexible membrane is positioned between the groove and fluid-receiving chamber in the respective opposing surfaces. Means connected to the fluid-receiving chamber is provided for supplying fluid under pressure thereto. A material outlet opening is provided between the groove and means mounted on the grooved member for attaching the seal to a vacuum system to allow passage therethrough of material from the groove into the vacuum system.

The apparatus of this invention solves the problem previously existent in the prior art, namely, how to feed an elongated material in a continuous manner into a vacuum system while still preserving the vacuum. It is an object of this invention to provide such a device and it is a further object of this invention to provide such a device wherein variations in pressure requirements needed to preserve the vacuum may be provided as required.

The above and other objects will appear more clearly from the following detailed description when taken in connection with the accompanying drawings which illustrate a preferred embodiment of the invention.

DESCRIPTION OF THE PREFERRED EMBODIMENT

Figure 1:
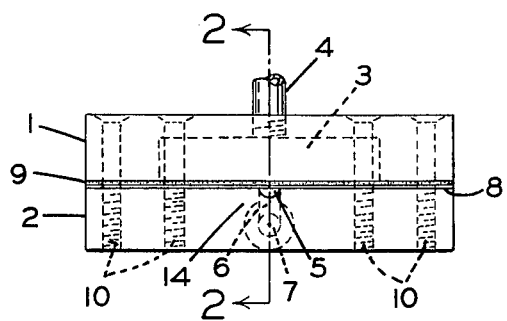
FIG. 1 is an elevational view of the input end of the vacuum seal.
Figure 2:
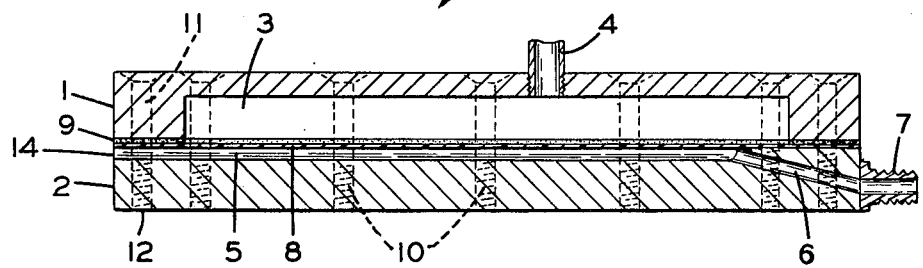
FIG. 2 is a side view in section taken along lines 2—2 of FIG. 1.
Figure 3:
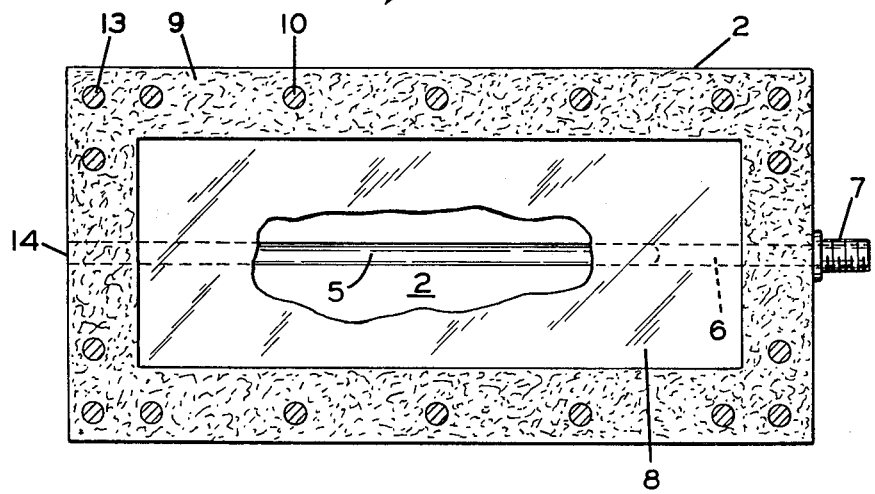
FIG. 3 is a plan view of the lower block of the seal with the flexible membrane and gasket in position thereon.

As shown in the drawings, the vacuum seal comprises upper and lower blocks 1 and 2 which may be constructed of any suitable rigid material such as metal, plastic, wood, hard rubber, and the like. An air chamber 3 is provided in the top block 1, and a conventional means 4 is provided on block 1 for connecting air chamber 3 with means (not shown) to supply air under pressure thereto. A groove 5 is provided in lower block 2. Groove 5 is located centrally with respect to the width of block 2 and extends longitudinally along a substantial portion of the length thereof. The contour of the groove 5 should be semi-circular or concave so that it snugly confines the yarn in the assembly. Sharp corners, such as those associated with V-shaped grooves and rectangularly shaped grooves, must be avoided since regions will be established that will not be filled by the yarn, thereby reducing pressure isolation. The groove should be rendered as friction-free as possible through the use of a Teflon (polytetrafluoroethylene) coating or by simply providing a smooth, polished metal surface. An offset tubular opening 6 leads from groove 5 at the output end of the device and extends from groove 5 to a conventional fitting 7 adapted to be connected to a vacuum system (not shown).

A flexible membrane 8 is provided between blocks 1 and 2 and overlies the slot or groove 5. The membrane material must be sufficiently thin (about 0.5 to 5 mils or 0.0127 mm to 0.127 mm, depending on the material used) to provide optimized contoured confinement of the yarn when inflated under modest inflation pressure of about 30 to 60 psi so that it completes the contoured yarn confinement that provides a seal and it must possess sufficient strength to withstand necessary sealing pressures. The membrane should also introduce a low coefficient of friction when pressed against the yarn so that the yarn may be drawn through the vacuum seal with minimized tension. Qualifying materials may be found in films of Teflon, polypropylene, and silicone rubber. The surface properties of the yarn should not be altered by the recommended seal before or after plasma treatment. The seal must preserve a vacuum of the order of 1 Torr during the continuous movement of the yarn through the system. A preferential value is found more in the vicinity of about 0.1 Torr. Various yarn sizes and materials may pose different problems, each of which may easily be appraised experimentally.

A rectangular gasket 9 of conventional gasket material is positioned between blocks 1 and 2 and extends around the outer edges of the opposing surfaces thereof. Blocks 1 and 2 are secured to each other by means of fastening members 10 which pass through appropriate openings 11 and 12 in blocks 1 and 2 and openings 13 in the gasket 9. Obviously, blocks 1 and 2 may be releasably held in their assembled relation by conventional means other than fastening members 10 to facilitate feeding the yarn into the sealing member.

In operation, a fibrous material such as a carpet yarn is fed into the slot 5 in the input end 14 of the device and is mechanically drawn through slot 5 and offset tubular opening 6 through vacuum fitting 7 into the vacuum system (not shown). Air under pressure is supplied through connecting means 4 to air chamber 3 in upper block 1 forcing flexible membrane 8 downward against the exposed side of the yarn passing through groove 5, causing it to conform closely to the shape of the groove, thus effecting a seal. As previously stated, the surface of groove 5 may be coated with, for example, Teflon, thus reducing the sliding friction of the material through the slot to a minimum and permitting reduced tension forces to move the yarn. The degree of vacuum seal may be continuously adjusted through variation of the pressure of the air opposite the flexible membrane by known methods. Further, the seal of this invention maintains a restriction that permits substantial pressure differences to exist during the passage of yarn between the two regions of different pressure. The flexible membrane automatically adjusts to variations in the yarn as it passes through the seal without disruption of the low pressures identified with the vacuum regions.

What is claimed is:

1. A vacuum seal adapted to permit continuous passage of filamentous material therethrough to a vacuum system, said seal comprising:
   a. a first rigid body member having at least one substantially flat surface with a fluid-receiving chamber extending inwardly therefrom;
   b. a second rigid body member having at least one substantially flat surface with a longitudinal groove therein extending from one end of the body to a point spaced inwardly from the other end thereof;
   c. means for fastening said body members together with said chamber and said groove in opposed relation to each other;
   d. a flexible membrane positioned between the body members and covering said chamber and said groove;
   e. means on said first body member in communication with said chamber for supplying fluid under pressure thereto;
   f. attaching means on said second body member for attaching said seal to a vacuum system; and
   g. means connecting said groove to said attaching means so that the material may pass from the groove through said connecting and attaching means into the vacuum system.

2. A vacuum seal according to claim 1 wherein the rigid body members are made of metal and the fluid-receiving chamber in said first body member extends longitudinally and transversely over a major portion of the area thereof.

3. A vacuum seal according to claim 2 wherein the groove in said second body member is centrally located with respect to the width thereof and has a smooth, arcuate surface contour.

4. A vacuum seal according to claim 3 wherein the groove in said second body member has a semi-circular, cross-sectional shape.

5. A vacuum seal according to claim 1 wherein said means connecting said groove in said second body member to said means for attaching the seal to a vacuum system comprises an opening which extends downwardly at an angle from the terminating point of the groove.

* * * * *